United States Patent
Griepentrog et al.

(12)

(10) Patent No.: US 6,597,552 B1
(45) Date of Patent: Jul. 22, 2003

(54) METHOD FOR PREVENTING MAKING ON ELECTRICAL SHORT CIRCUITS EXISTING IN BRANCHES AND CORRESPONDING DEVICE

(75) Inventors: Gerd Griepentrog, Gutenstetten (DE); Holger Hochgraef, Ganzer/Wusterhausen (DE); Reinhard Maier, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/019,897
(22) PCT Filed: Jun. 28, 2000
(86) PCT No.: PCT/DE00/02108
§ 371 (c)(1), (2), (4) Date: Dec. 28, 2001
(87) PCT Pub. No.: WO01/01540
PCT Pub. Date: Jan. 4, 2001

(30) Foreign Application Priority Data

Jun. 30, 1999 (DE) .......................................... 199 30 122

(51) Int. Cl.⁷ ................................................ H02H 3/00
(52) U.S. Cl. ........................................................ 361/62
(58) Field of Search ............................... 361/10, 62, 65, 361/66, 68, 72

(56) References Cited

U.S. PATENT DOCUMENTS 4,894,745 A  1/1990  Akagawa et al.

FOREIGN PATENT DOCUMENTS

| DE | 196 01 878 A1 | 7/1997 |
| EP | 0 563 695 A2 | 10/1993 |

*Primary Examiner*—Edward H. Tso
(74) *Attorney, Agent, or Firm*—Harness, Dickey & Pierce, P.L.C.

(57) ABSTRACT

A method is for preventing tapping into existing short circuits in branches. A power supply momentarily is connected in a test circuit at a defined instant of the power supply voltage and at least the current in the test time period is detected and evaluated as a criterion for a short circuit. The short-circuit current is limited by the use of an additional test resistor which is arranged in the test circuit in series preferably with a semiconductor switch. Solely the test current and/or the test voltage is used for identification of the short circuit. In the associated arrangement, a test resistor having a defined resistance, whose resistance is significantly greater than the power supply impedance, is arranged in the test circuit in series with the semiconductor switch.

19 Claims, 3 Drawing Sheets

METHOD FOR PREVENTING MAKING ON ELECTRICAL SHORT CIRCUITS EXISTING IN BRANCHES AND CORRESPONDING DEVICE

This application is the national phase under 35 U.S.C. §371 of PCT International Application No. PCT/DE00/02108 which has an International filing date of Jun. 28, 2000, which designated the United States of America, the entire contents of which are hereby incorporated by reference.

FIELD OF THE INVENTION

The invention generally relates to a method for preventing tapping into existing short circuits in branches by a power supply momentarily being connected in a test circuit at a defined instant of the power supply voltage, wherein at least the current is detected in a test time period and is evaluated as a criterion for a short circuit. The invention more preferably relates to the associated arrangement for carrying out the method. More preferably, it relates to a diagnosis and protection circuit for the power supply branch, which contains at least one semiconductor switch whose current can be integrated over a test time period and whose time integral can be evaluated as a decision criterion for a short circuit.

BACKGROUND OF THE INVENTION

Power switches, in particular, and also the rest of the operating equipment, are stressed very greatly by the switching-on of a branch afflicted with a short circuit. The reason for this is that the stress duration and hence the Joule heat integral and the forward current are very high as a result of the switch-on operation that must be ended, and the subsequent switch-off operation.

The latter refers to the fact that it is desirable, in the case of a branch to be switched on, to automatically test the branch in advance for a possible short circuit, and to block the connection if a faulty installation is present. In this case, the test duration should be short enough so that the switching action is not appreciably delayed and the loading on the installation remains low. In order to be able to detect insulation damage in the case where the breakdown occurs at higher voltages, the test voltage should correspond approximately to the peak value of the power supply voltage, but not be significantly higher than the latter, in order to prevent additional insulation damage.

EP 0 563 695 A2 has already previously disclosed a method in which the power supply is momentarily connected at the peak value of the power supply voltage, for which purpose a GTO (Gate Turn Off thyristor), in particular, is used. In this case, the time integral of the current in the test time period is used as a decision criterion for the presence of a short circuit, so that a short circuit is identified when a threshold value is exceeded. In this method, the current is limited only by the internal resistance of the power supply and by the forward resistance of the GTO. Thus, in power supplies with a high prospective short-circuit current, in the fault situation currents flow which can no longer be switched by a GTO according to the prior art.

Furthermore, DE 196 01 878 A1 discloses a connection arrangement for load networks which effects a connection in the short-circuit-free state within permissible operating quantities by means of at least one switching path. In this case, a connection path in parallel with the load and a bridge path serve, in the sense of a voltage divider, additionally for providing protection against making in the short-circuit situation.

SUMMARY OF THE INVENTION

Taking this as a departure point, it is an object of the invention to specify a method and to provide an associated circuit arrangement with which the presence of short circuits is identified and tapping into short circuits existing in branches can be prevented even in power supplies with a very high prospective short-circuit current.

In the case of a method and an apparatus of the type mentioned in the introduction, the object is achieved according to the invention, for example, by the procedure in accordance with patent claim 1 and the features in accordance with patent claim 10, respectively. Advantageous developments are specified in the respective dependent claims.

In the case of one embodiment of the invention, an additional test impedance is used, solely the test current and the voltage being evaluated in order to identify the short circuits. With such a test impedance, the maximum test current that is to be turned off by the semiconductor switch preferably used can advantageously be limited to a predetermined value. In this case, the value RB of such a test impedance must be significantly greater than the power supply impedance.

The method according to an aspect of the invention makes it possible, in the case of single-phase testing, to effect a direct evaluation of test current and test voltage for the purpose of identifying short circuits between conductor and ground in the individual branches of the line power supply. However, the method can also be extended to three-phase power supplies, it being possible to identify ground or neutral conductor faults and also external conductor faults inter se and the individual short circuits being able to be discriminated.

In the case of an arrangement in accordance with an embodiment of the invention, a test resistor which has a defined resistance $R_B$ and whose resistance $R_B$ is significantly greater than the power supply impedance $Z_{power\ supply}$ is arranged in the test circuit in series with the semiconductor switch used in the test circuit. In the application for three-phase testing, each semiconductor switch is preferably assigned a dedicated test resistor. Since the individual branches are tested one after the other, there may be present common units for driving alternatively one of the semiconductor switches or a common superordinate control unit.

BRIEF DESCRIPTION OF THE DRAWINGS

Further details and advantages of the invention emerge from the following figure description of exemplary embodiments with reference to the drawing in conjunction with further patent claims.

In the figures.

In the figures, identical or identically acting parts have identical or mutually corresponding reference symbols. The figures are described jointly in part.

DETAILED DESCRIPTION OF THE PREFERRED EMBODIMENTS

Figure 1:
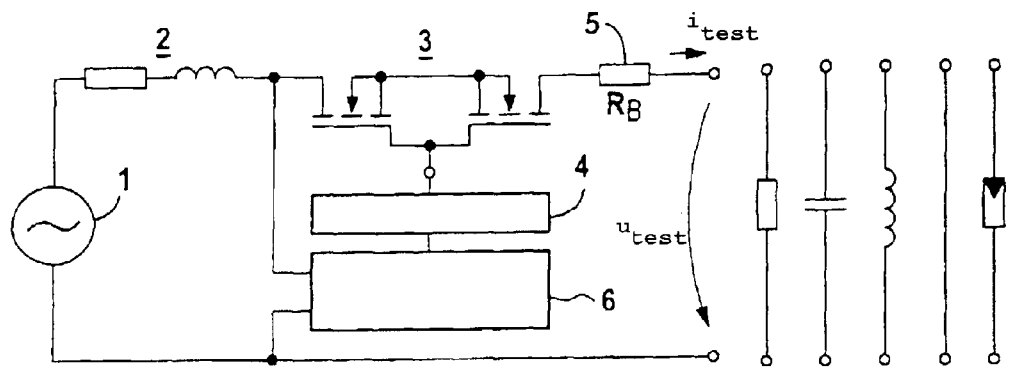
FIG. 1 shows a circuit arrangement of a semiconductor switch and resistor connected downstream in the case of single-phase testing.

Before the turn-on of individual branches of a single-phase power supply or the individual phases of a polyphase power supply, a test should already be performed to determine whether a short circuit is present, in order that, in such a case of a faulty installation, the connection is blocked and it is no longer possible for there to tap into existing short circuits in branches. To that end, FIG. 1 shows that an electrical power supply 1 with a power supply impedance 2 illustrated diagrammatically therein, the impedance having at least a resistive component and an inductive component, is connected to a test resistor 5 having a defined resistance $R_B$ by a semiconductor switch 3.

By way of example, a switch formed from power semiconductors that are reverse-connected in series is used as the semiconductor switch 3. The power semiconductors may be constructed on the basis of silicon carbide (SiC). The semiconductor switch 3 is assigned to a drive unit 4, a superordinate control unit 6 being present.

In the arrangement in accordance with FIG. 1, the test current $i_{test}$ and the test voltage $u_{test}$ are measured. Various load cases are indicated, i.e. a resistive load, a capacitive load and an inductive load of the branch, and also a short circuit as a solid short circuit and as an arcing short circuit. The latter is identified by the arrester symbol.

Assuming that the test resistor 5 has an exactly defined resistance $R_B$ which is significantly greater than the power supply impedance, the maximum test current that is to be turned off by the semiconductor switch 3 can be limited to the value $\sqrt{2} \times U_N/R_B$. Destruction of components is thus avoided.

The semiconductor switch 3 is switched on for a specific time period, for example one millisecond (ms). In order to identify short circuits, the test current $i_{test}$ and the voltage $u_{test}$ on the branch are measured and evaluated.

A consideration of loads with different types of impedances without a short circuit and with a short circuit demonstrates the typical profiles of test voltage $u_{test}$ and test current $i_{test}$ in the individual cases. The different situational configurations are illustrated with reference to FIG. 2.

Figure 2:
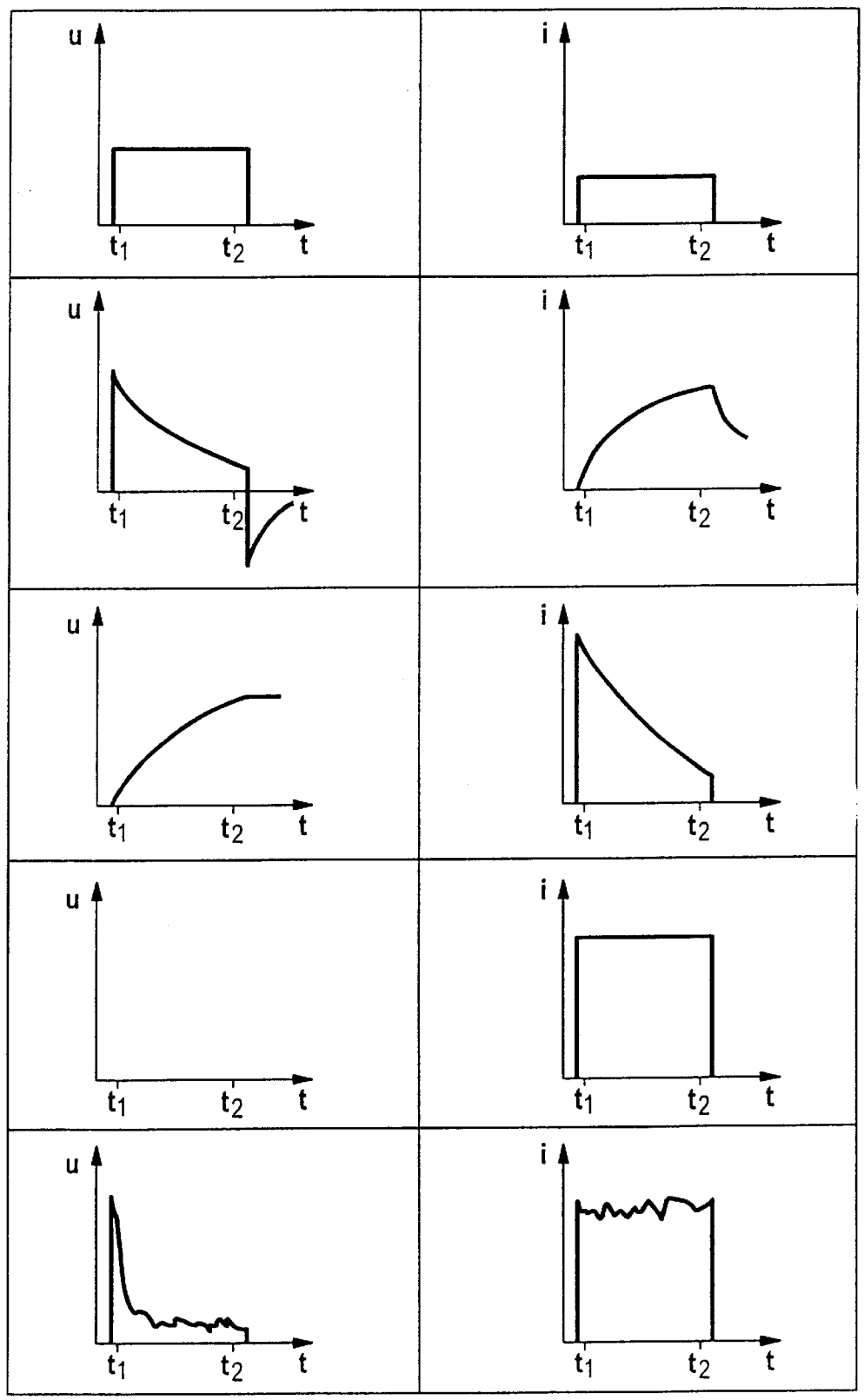
FIG. 2 shows the profile of test current and test voltage for different situational configurations.

Different loads without a short circuit are considered in the first three rows of FIG. 2: if a straightforward resistance occurs, a rectangular voltage profile is produced in accordance with the first row, the profile being followed by a rectangular current profile in the same temporal sequence. By contrast, if the load is an inductance, which is manifested for example in the case of a motor, in accordance with the second row the test voltage $u_{test}$ will rise, fall rapidly and, after a transition to the opposite value, fall rapidly again. If a capacitive reactance is present, which is manifested in the case of a compensation installation, in the case of fluorescent lamps, in the case of ballasts or power supply units of electronic apparatuses, such as a PC for example, in accordance with the third row the test voltage $u_{test}$ will rise in accordance with an asymptotic curve to a maximum. In a corresponding manner, the current profile decreases from a maximum value according to an exponential function to a minimum value.

The last two rows in FIG. 2 represent short-circuit situations: a short circuit is defined by a low-impedance connection, in which, in accordance with the fourth row, in the case of a zero value of the test voltage, a sharp rise in the test current proceeds with a rectangular current profile. Specifically in the case of an arcing short circuit, in accordance with the fifth row, the voltage proceeds in a manner falling sharply from a maximum and non-uniformly to zero, whereas the current profile varies non-uniformly at a high level.

If short circuits are then present in the predetermined arrangements, the following holds true for the test voltage $i_{test}$ when using the current-limiting resistor:

$$i_{test} = \sqrt{2} \times u_N / R_B \tag{1}$$

where $U_N$ denotes the nominal voltage and $R_B$ denotes the resistance of the test resistor 5. If, in previously described configurations without a short circuit and with a short circuit, the test voltage $u_{test}$ and the test current $i_{test}$ are compared with corresponding threshold values $U_T$ and $I_T$ at two different instants $t_1$ and $t_2$, preferably approximately at the beginning and end of the test interval, in the following specification results for the identification of short circuits $$\text{short circuit} = (u_{t2} < U_{T2})\hat{} (i_{t1} > I_{T1})\hat{} (i_{t2} > I_{T2}) \tag{2}$$

where the designations have the following meanings $U_{T2}$:threshold value of the test voltage $u_{test}$ at the instant $t_2$ $I_{T1}$:threshold value of the test current $i_{test}$ at the instant $t_1$ $I_{T2}$:threshold value of the test current $i_{test}$ at the instant $t_2$. The choice of the instants t1 and t2 and the dimensioning of the threshold values $U_T$ and $I_T$ are dependent on the power supply conditions, the impedance of the branch to be tested, and the test resistor chosen.

Another specification can be derived by detecting exclusively the test voltage $u_{test}$ after a minimum test duration ($t_p$) has elapsed. If a threshold voltage $U_t$ is exceeded, the test can then be terminated with the result "no short circuit", and the following holds true:

$$\text{no short circuit} = (u_t > U_T)\hat{}(t > t_p) \tag{3}$$

where the designations have the following meanings $U_T$:threshold value of the test voltage $u_{test}$ for the test result "no short circuit"

$t_p$:minimum test duration.

In addition, in order to increase the statement reliability, it can be demanded that the time duration in which the test voltage $u_{test}$ is greater than the threshold voltage $U_T$ exceeds a specific minimum value.

The criterion in accordance with equation (3) has the advantage over the criterion in accordance with equation (2) of a shorter test duration which is dependent on the impedance of the branch to be tested, so that, in particular in the case of inductive branches, no relatively large currents have to be turned off by the semiconductor switch 3. Minimum test duration $t_p$ and threshold voltage $U_T$ are preferably to be dimensioned such that arcing short circuits that are latently present in the branch are struck after $t_p$ has elapsed and their burning voltage lies below the threshold voltage $U_T$.

Provided that no short circuit is identified by the methods in accordance with equations (2) and/or (3), the respective branch can be completely connected into the power supply, the semiconductor switch 3 and the test resistor 5 then being bridged.

Figure 3:
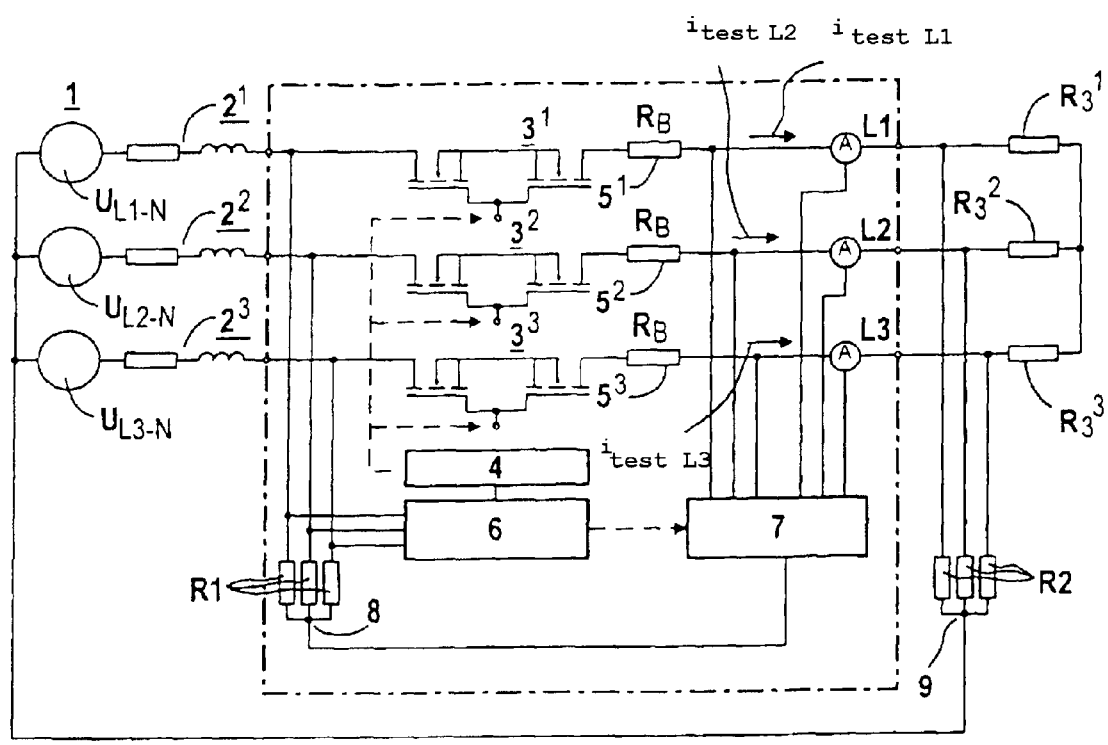
FIG. 3 shows a circuit arrangement in accordance with FIG. 1 in the case of three-phase testing.

FIG. 3 illustrates a circuit arrangement for three-phase testing according to the method described above. Such a circuit is expedient for three-phase branches, since both ground or neutral conductor faults and short circuits between two or three external conductors can occur.

Analogously to the circuit in accordance with FIG. 1, in FIG. 3 semiconductor switches $3^1$, $3^2$ and $3^3$ are provided in each phase and test resistors $5^1$, $5^2$ and $5^3$ are provided in the individual external conductors. The individual semiconductor switches $3^1$, $3^2$ and $3^3$ are driven by the common unit 4, to which a superordinate controller 5 is assigned in accordance with FIG. 1. Moreover, a central unit 6 for evaluation is now present. Control unit 5 and evaluation unit 6 are in each case connected to the phases individually and inter se, with incorporation of resistors R, to an artificial neutral point 8. The neutral or ground conductor PEN is likewise connected via three defined resistors $R_2$ with a common star point 9 to the external conductors with resistors $R_B$.

Figure 4:
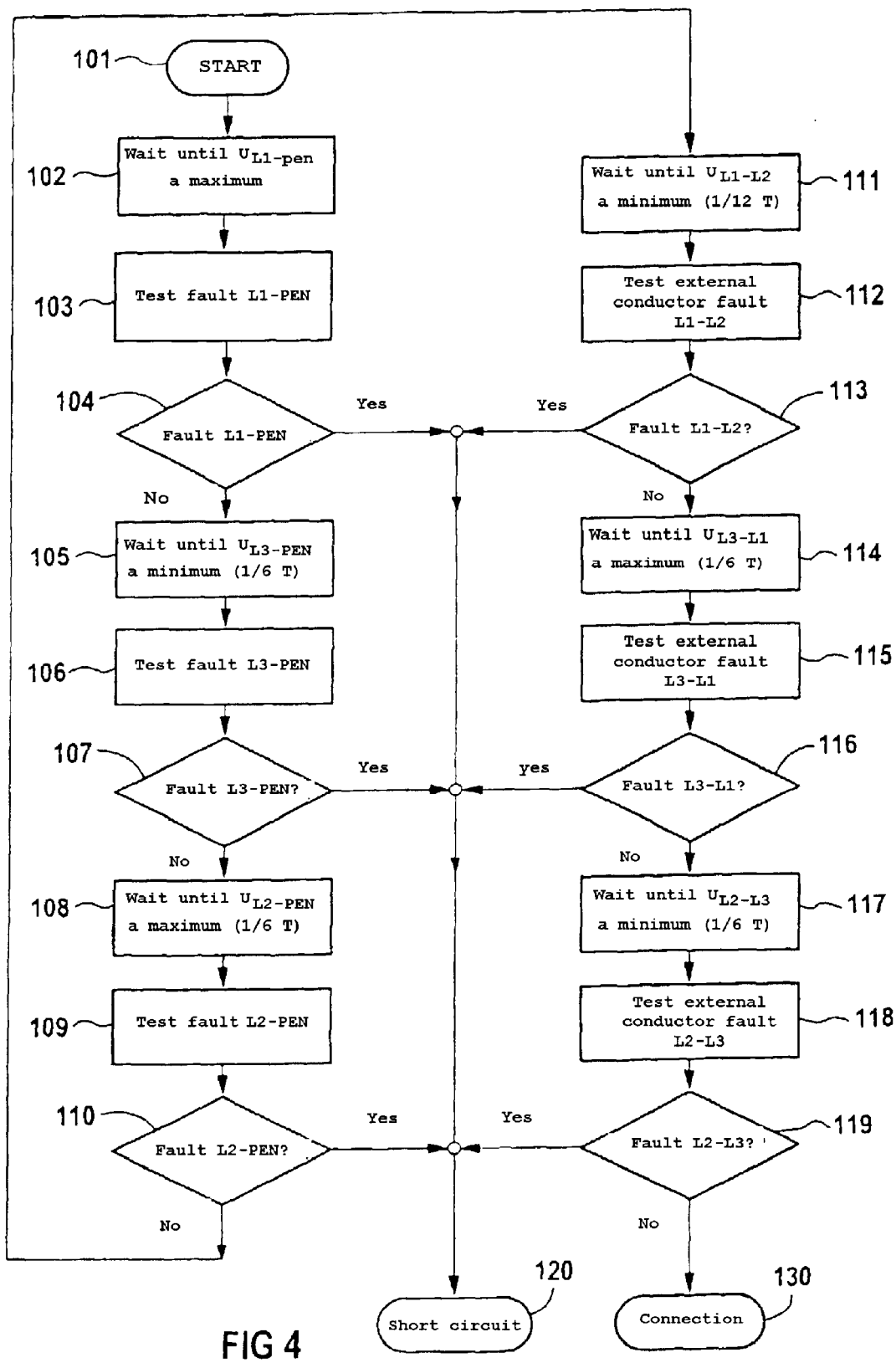
FIG. 4 shows a flow diagram for illustrating the algorithm for the purpose of identifying shorter circuits in the case of the three-phase testing in accordance with FIG. 3.

In the case of three-phase testing, the testing is effected in accordance with a predetermined algorithm, which is represented as a flow diagram in FIG. 4. In this case, the essential steps are illustrated using the individual positions 101 to 120, decision criteria for the short circuit in each case being interrogated.

In detail, the procedure is as follows:

The start is followed by the switching-on of the semiconductor switch in the external conductor L1 at the peak value of the voltage $U_{L1-N}$ and the evaluation of the test current $I_1$ and of the test voltage between the branch L1 and the neutral conductor. In this case, in accordance with position 102, there is a wait until $U_{L1-PEN}$ is a maximum and then, in accordance with position 102, the test is concluded. If a short circuit is present according to one of the criteria specified above, the decision Yes is taken at position 104 and the short circuit is indicated. If no short circuit is present, the test is continued. What takes place in this case is, in accordance with the positions 105 and 106, the testing of the branch L3 with the decision as to whether a short circuit is present in the branch L3, and then the corresponding testing in the conductor branch L2 in accordance with the positions 108 to 110. In detail, the external conductors L3 and L2 are tested for a ground fault at an interval of in each case ⅙ of the power supply period, that is to say 60°, by the corresponding semiconductor switches $3^3$ and $3^2$ momentarily being switched on.

After the testing of the ground fault in the external conductor L2 in accordance with position 110, the two semiconductor switches $3^1$ and $3^2$ in the external conductors L1 and L2 are jointly switched on in a manner offset by 1/12 of the power supply period, that is to say 30°. In accordance with the positions 111 to 112, the external conductor fault between L1 and L2 is tested, in which case, if a fault is ascertained, a corresponding indication is once again made at the position 120.

If the latter is not the case, the external conductor faults L3-L1 and L2-L3 are tested in a manner offset by in each case ⅙ of the power supply period, that is to say 60°. The former is effected on the basis of the positions 114 to 116 and the latter on the basis of the positions 117 to 118, it once again being the case that if a short circuit is identified, the test algorithm is terminated, the indication is made at the position 120 and the connection of the branch is blocked. If the test algorithm is carried out until the conclusion, the branches can be connected in accordance with position 121.

For the case where the neutral conductor is not connected to the test unit, an artificial neutral point 8 is created at the feeding-in side by three non-reactive resistors $R_1$, said artificial neutral point being at ground potential under balanced voltage conditions.

What occurs in the exemplary arrangements is that the test current is limited by the arrangement of a suitable test resistor in the test circuit and, equally, test current and test voltage are used for identification of short circuits in the branches. In this case, a wide variety of short circuits can be selected by suitable adaptation of the parameters. By applying the method to three-phase power supplies, ground or neutral conductor faults and external conductor faults can also be identified separately with respect to one another. With the specification of a suitable algorithm, this can be effected for all of the conductors successively in a power supply period under the control of software.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for preventing tapping into existing short circuits in electrical branches comprising:

momentarily connecting a power supply in a test circuit at a defined instant of the power supply voltage;

detecting at least the current in a test time period; and evaluating at least the detected test current as a decision criterion for a short circuit, wherein an additional test impedance is used, arranged in the test circuit in series with a switch which limits a short-circuit current, and wherein at least one of the test current and a test voltage are used for identification of the short circuit.

2. The method as claimed in claim 1, wherein at least one of the test current and voltage are detected directly at the branch and evaluated.

3. The method as claimed in claim 1, wherein only the test voltage is evaluated, and wherein the power supply is connected at the peak value of the power supply voltage.

4. The method as claimed in claim 1, wherein the test current and test voltage are measured at two instants and compared with threshold values, and wherein statements about the presence of a short circuit are derived through plausibility considerations.

5. The method as claimed in claim 4, wherein the following holds true for a short circuit:

$$\text{short circuit} = (u_{t2} < U_{T2})\hat{}(i_{t1} > I_{T1})\hat{}(i_{t2} > I_{T2}) \qquad (2),$$

where the designations have the following meanings $U_{T2}$:threshold value of the test voltage $u_{test}$ at the instant $t_2$ $I_{T1}$:threshold value of the test current $i_{test}$ at the instant $t_1$ $I_{T2}$:threshold value of the test current $i_{test}$ at the instant $t_2$.

6. The method as claimed in claim 4, wherein the following holds true for the presence of no short circuit:

$$\text{no short circuit} = (u_t > U_T)\hat{}(t > t_p) \qquad (3),$$

where the designations have the following meanings $U_T$:threshold value of the test voltage $u_{test}$ for the test result "no short circuit"

$t_p$:minimum test duration.

7. The method as claimed in claim 1, wherein the method is for single-phase testing of a short circuit between conductor and neutral conductor.

8. The method as claimed in claim 1, wherein the method is for the three-phase testing of short circuits between at least one of the individual external conductors and the neutral conductor and among the external conductors.

9. The method as claimed in claim 8, wherein the testing of possible ground or neutral conductor faults and also of external conductor faults is effected successively in a power supply period.

10. An arrangement for carrying out the method as claimed in claim 1 comprising:
   a diagnosis and protection circuit for the power supply branch including a switch whose current or current integral can be evaluated as a decision criterion for a short circuit and thus forms a test circuit, the switch in the test circuit including at least one semiconductor switch and a test resistor, whose resistance is significantly greater than the power supply impedance, being arranged in the test circuit in series with the semiconductor switch.

11. The arrangement as claimed in claim 10, wherein the test circuit contains at least one control unit for controlling the connection of the power supply impedance.

12. The arrangement as claimed in claim 10, wherein the semiconductor switch is assigned a drive unit, driven by the control unit in the test circuit.

13. The arrangement as claimed in claim 10, wherein for use in three-phase testing, each semiconductor switch is assigned a dedicated test resistor having an identical resistance, in which case, in the three-phase power supply, the individual branches are assigned a common unit for driving the semiconductor switches and a common control unit.

14. The arrangement as claimed in claim 13, wherein a common unit is present for evaluating at least one of the test current and the test voltage.

15. The arrangement as claimed in claim 13, wherein artificial neutral points with zero potential are formed by the individual branches of the three-phase power supply via resistors having a defined resistance.

16. The method as claimed in claim 2, wherein only the test voltage is evaluated, and wherein the power supply is connected at the peak value of the power supply voltage.

17. The method as claimed in claim 2, wherein the test current and test voltage are measured at two instants and compared with threshold values, and wherein statements about the presence of a short circuit are derived through plausibility considerations.

18. The method as claimed in claim 3, wherein the test current and test voltage are measured at two instants and compared with threshold values, and wherein statements about the presence of a short circuit are derived through plausibility considerations.

19. The arrangement as claimed in claim 14, wherein artificial neutral points with zero potential are formed by the individual branches of the three-phase power supply via resistors having a defined resistance.

* * * * *